United States Patent [19]
Negi et al.

[11] Patent Number: 5,150,871
[45] Date of Patent: Sep. 29, 1992

[54] VEHICLE SEAT

[75] Inventors: Yoshitaka Negi; Hiroshi Matsuura, both of Kosai, Japan

[73] Assignee: Fujikiko Kabushiki Kaisha, Tokyo, Japan

[21] Appl. No.: 826,369

[22] Filed: Jan. 27, 1992

Related U.S. Application Data

[62] Division of Ser. No. 536,349, Jun. 11, 1990, Pat. No. 5,083,735.

[30] Foreign Application Priority Data

Jun. 30, 1989 [JP] Japan ............... 1-77320[U]
Jun. 30, 1989 [JP] Japan ............... 1-77321[U]

[51] Int. Cl.$^5$ .................................... F16M 13/00
[52] U.S. Cl. ................................ 248/429; 297/344
[58] Field of Search ........... 248/429, 430; 297/468, 297/344, 341, 346, 471; 296/65.1

[56] References Cited

U.S. PATENT DOCUMENTS

| | | | |
|---|---|---|---|
| 4,508,385 | 4/1985 | Bowman | 297/341 |
| 4,635,890 | 1/1987 | Matsuda | 248/429 |
| 4,730,804 | 3/1988 | Higuchi | 297/344 |
| 4,742,983 | 5/1988 | Nihei | 297/341 X |
| 4,909,469 | 3/1990 | Nihei | 296/65.1 X |
| 4,927,110 | 5/1990 | Tsumura | 248/430 |

Primary Examiner—J. Franklin Foss
Attorney, Agent, or Firm—Hopkins & Thomas

[57] ABSTRACT

The vehicle seat comprises a pair of lower rails arranged on the vehicle floor at an interval; a pair of upper rails slidably mounted on the lower rails, respectively; and a pair of base plates fixed to the upper rails, respectively at both the ends thereof with bolts or ribets. To further reinforce the fixing strength between the base plate and the upper rail; that is, to prevent the inward deformation of the base plate from the upper rail at the middle portion thereof when a large load is applied to the base plates, the base plates and the upper rails are removably engaged with each other, respectively at the middle thereof by means of a pin and a hole or male and female engagement members, without use of bolts or rivets, thus facilitating the base plate mounting work on the upper rails.

3 Claims, 4 Drawing Sheets

VEHICLE SEAT

CROSS REFERENCE

This is a division of U.S. patent application Ser. No. 07/536,349 filed Jun. 11, 1990 now U.S. Pat. No. 5,083,735.

BACKGROUND OF THE INVENTION

1. Field of the Invention

The present invention relates to a vehicle seat movable in the longitudinal direction of the vehicle, and more specifically to a vehicle seat of a simplified base plate mounting structure.

2. Description of the Prior Art

In automotive vehicles, in particular in passenger cars, the vehicle seats are so constructed as to be movable in the longitudinal direction of the vehicle according to driver's body size to improve driver's comfortability. The vehicle seat of this type, in general, comprises a pair of lower rails arranged on a vehicle body floor at an interval in the vehicle transversal direction and a pair of upper rails slidably disposed on the lower rails, respectively. Further, a pair of base plates with a seat reclining device for adjusting an inclination angle of the seat back are fixed on the upper rails, respectively. Further, the vehicle seat comprises a lock mechanism for locking the seat at any desired position in cooperation with a seat position locating member disposed on the lower rail or the vehicle body floor at the middle portion of the upper rail or the base plate.

In the above-mentioned structure, each base plate is fixed to the upper rail at two front and rear positions with bolts or rivets. In this prior-art structure, however, when a large load is applied to the seat, since the base plate is not fixed at the middle portion of the base plate, there exists a problem in that the strength of the base plate is not sufficient and therefore the base plate tends to be deformed or moved inward relative to the upper rail. To overcome the above-mentioned problem, it is possible to increase the thickness of the base plate for providing higher rigidity and larger mounting strength. However, there arises another problem in that the weight and the cost of the material increase. Therefore, conventionally, the base plate is fixed to the upper rail with bolts or rivets at the front, middle and rear positions.

In the prior-art vehicle seat mounting structure, however, since the base plate is fixed to the upper rail at three (front, middle, and rear) different positions, there still exists another problem in that the number of mounting steps increases and therefore the mounting cost is high.

SUMMARY OF THE INVENTION

With these problems in mind, therefore, it is the primary object of the present invention to provide a vehicle seat which can faciliatate the base plate mounting structure and increase the base plate mounting strength.

To achieve the above-mentioned object, the vehicle seat according to the present invention comprises: (a) a pair of lower rails (10) arranged on a vehicle body floor at an interval along a vehicle transversal direction; (b) a pair of upper rails (20) slidably disposed on said lower rails, respectively; (c) a pair of base plates (30) fixed to said upper rails, respectively on both ends thereof; and (d) engagement means for removably engaging said base plates and said upper rails at roughly middle portions thereof, respectively to prevent inward deformation of each of said base plates from each of said upper rails when a large load is applied to said base plates.

In the first embodiment, the engagement means comprises: (a) an engagement pin (21) projectingly disposed at roughly the middle of said upper rail; and (b) an engage hole (31) formed at roughly the middle of said base plate, said engage pin being engagement with said engagement hole before said base plate is fixed to said upper rail at both the ends thereof. In the second embodiment such that a lock mechanism (50) having a lock arm mounting member (51) is fixed to said upper rail at roughly middle thereof to lock the seat at any desired position in cooperation with a seat position locating member (40), said engagement means comprises: (a) a female engagement portion (52) formed integral with the lock arm mounting member of the lock mechanism; and (b) a male engagement member (36) fixed to said base plate at the middle thereof and engageable with said female engagement portion of the lock arm mounting member.

In the vehicle seat according to the present invention, since the headed pin fixed to the upper rail is engagement with an engagement hole formed in the base plate or since the female engagement portion of the lock arm mounting member fixed to the upper rail is engaged with a male engagement member fixed to the base plate, it is possible to facilitate the base plate mounting structure and the base plate mounting strength. As a result, the cost of the vehicle seat can be reduced and simultaneously the base plates can be prevented from being deformed inward from the upper rails when a large load is applied to the vehicle seat.

BRIEF DESCRIPTION OF THE DRAWINGS

The features and advantages of the vehicle seat according to the present invention will be more clearly appreciated from the following description taken in conjunction with the accompanying drawings in which like reference numerals designate corresponding elements and in which.

DETAILED DESCRIPTION OF THE PREFERRED EMBODIMENTS

Figure 1:
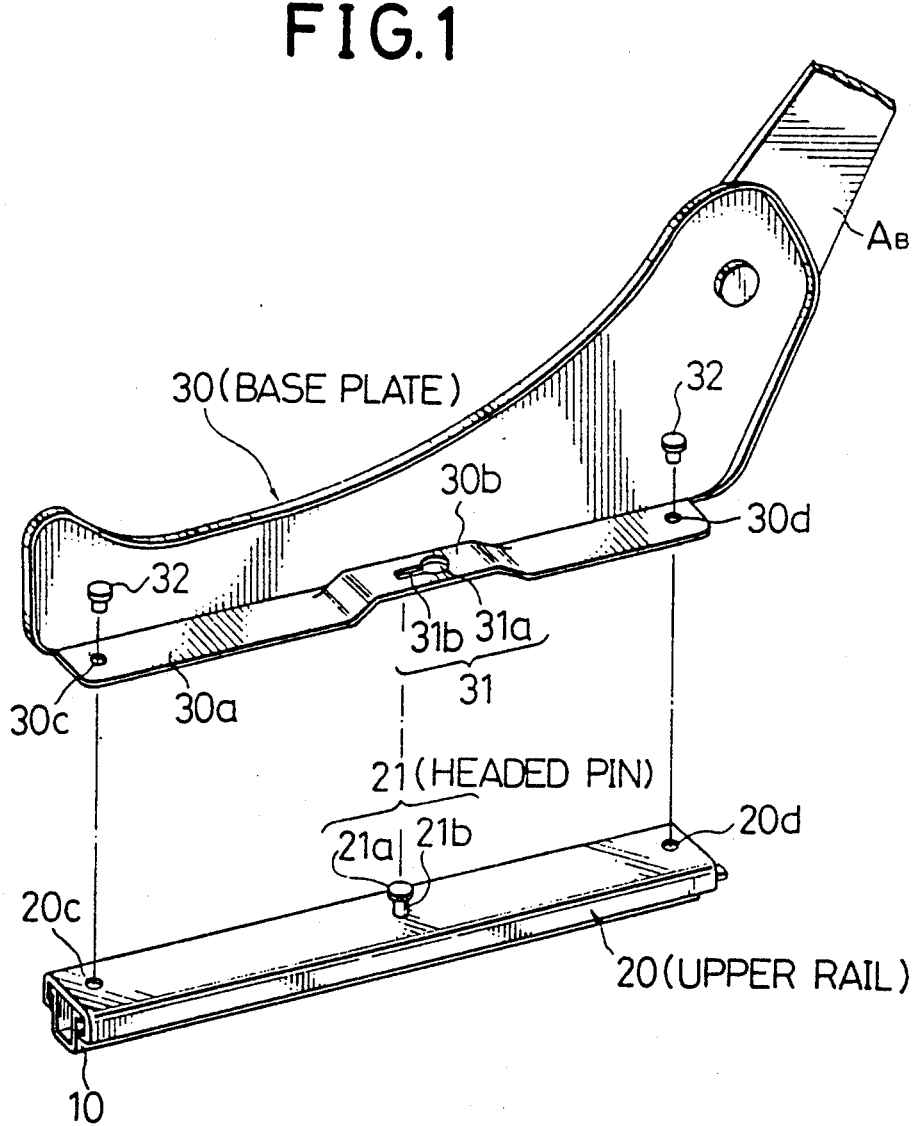
FIG. 1 is a partial exploded view showing a first embodiment of the vehicle seat according to the present invention, in which only the one lower side thereof is shown.
Figure 2A:
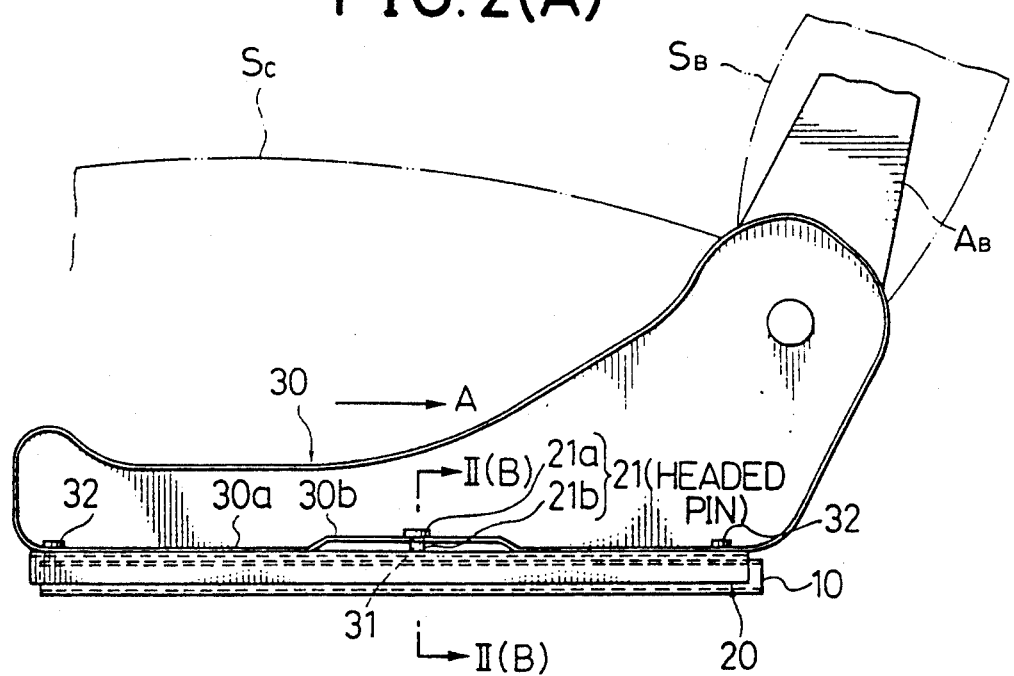
FIG. 2(A) is a partial diagrammatical side view showing the same first embodiment shown in FIG. 1.
Figure 2B:
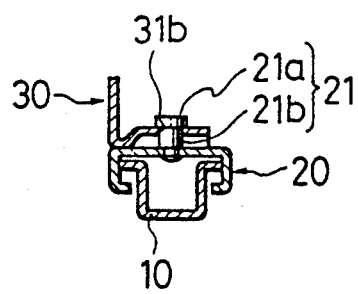
FIG. 2(B) is a partial cross-sectional view taken along the line II(B)—II(B) shown in FIG. 2(A)

The vehicle seat of the present invention will be described hereinbelow with reference to the attached drawings. FIGS. 1, 2(A) and 2(B) show a first embodiment thereof.

In the drawings, a vehicle seat comprises a pair of lower rails 10 (only one is shown) arranged on a vehicle body floor at an interval along the vehicle transversal direction, a pair of upper rails 20 slidably disposed on the lower rails 10, and a pair of base plates 30 fixed to the upper portions of the upper rails 20, respectively. In the following description, however, only one lower side essential portion of the vehicle seat will be explained with reference to the drawings.

In this first embodiment, in particular, a headed engagement pin 21 is provided at the middle of the upper rail 20 so as to project therefrom, and further an engagement hole 31 for receiving the head portion of the headed engagement pin 21 is formed in the base plate 30 at such a position as to be opposed to the pin 21.

The structure will be described in further detail hereinbelow. The headed engagement pin 21 is projectingly disposed at the middle portion of the upper rail 20. This headed engagement pin 21 is formed with a head portion 21a and a cylindrical portion 21b. The base plate 30 is formed (at the lower edge) with a mounting portion 30a bent toward the headed engagement pin side. The mounting portion 30a is formed with a middle upward bent mounting surface 30b, and an engagement hole 31 is formed in this surface 30b so as to be opposed to the headed engagement pin 21. The engagement hole 31 includes a circular portion 31a into which the head portion 21a of the headed engagement pin 21 is loosely inserted, and a slot portion 31b (communicating with the circular portion 31a on the front side) into which the cylindrical portion 21b is inserted. Therefore, when the cylindrical portion 21b is engaged with the slot portion 31b, the mounting surface 30b of the base plate 30 is fixed to the upper surface of the upper rail 20 via the head portion 21a.

The mounting portion 30a of the base plate 30 is formed with front and rear insertion holes 30c and 30d. Further, the upper rail 20 is formed with other front and rear insertion holes 20c and 20d so as to match the holes 30c and 30d in position. Therefore, the base plate 30 is fixed to the upper rail 20 at both the front and rear positions by screwing bolts into these holes or by inserting rivets into these holes before upsetting.

A seat cushion $S_C$ is fixed to the base plate 30, and further a back arm $A_B$ to which a seat back $S_B$ is fixed is pivotally attached to each base plate 30. Further, the base plates 30 are so constructed as to lock the back arms $A_B$ at an appropriate position by a lock mechanism (not shown), respectively.

The function of this embodiment will be described hereinbelow. To fix the base plate 30 to the upper rail 20, first the head portion 21a of the headed engagement pin 21 is loosely inserted into the circular portion 31a of the engagement hole 31 formed in the base plate 30, and then the base plate 30 is moved rearward (in the arrow direction A). Thereafter, when the cylindrical portion 21b of the pin 21 is engaged with the slot portion 31b, since the mounting surface 30b of the base plate 30 is urged toward the upper rail 20 by the head portion 21a of the pin 21, the base plate 30 is temporarily fixed to the upper rail 20.

Under these conditions, since the two insertion holes 30c and 30d of the base plate 30 match the two insertion holes 20c and 20d of the upper rail 20 in position, rivets 32 are inserted into these insertion holes from the base plate side and upset on the opposite surface side of the upper rail 20, to fix the base plate 30 to the upper rail 20 at both the front and rear positions.

As described above, the middle portion of the mounting surface 30b of the base plate 30 can be firmly fixed to the upper rail 20 by the head portion 21a of the headed engage pin 21 engaged with the engagement hole 31. Therefore, it is possible to eliminate complicated base plate mounting work such that bolts are screwed or rivets are upseted at the middle portion of the base plate 30, as is conventional. That is, it is possible to facilitate the mounting structure of the base plate 30, to improve the mounting strength of the base plate 30, and to prevent the base plate 30 from being deformed inward from the upper rail when a large load is applied to the seat.

Further, in the above embodiment, the headed engagement pin 21 is provided on the upper rail 20, and the engagement hole 31 is formed in the base plate 30. However, it is also possible to provide the engagement pin on the base plate and to form the engagement hole in the upper rail. Further, the shape of the headed engagement pin 21 is not limited to the round shape, but can be formed into a triangular shape, for instance.

As described above, in the vehicle seat according to the present invention, since the middle portion of the base plate is fixed to the upper rail by engaging the head portion of the headed engagement pin with the engagement hole, the base plate mounting structure can be facilitated; the base plate mounting strength can be improved; the cost of the seat can be reduced; and further the inward deformation of the base plate from the upper rail under large load can be prevented.

FIGS. 3(A), 3(B), 4(A) and 4(B) show a second embodiment of the vehicle seat according to the present invention. In the drawings, a vehicle seat similarly comprises a pair of lower rails 10 (only one is shown) arranged on a vehicle body floor at an interval along the vehicle transversal direction, a pair of upper rails 20 slidably disposed on the lower rails 10, and a pair of base plates 30 fixed to the upper portions of the upper rails 20, respectively. Further, a lock mechanism 50 is disposed at the middle portion of the upper rail 20 to lock the seat at any desired position in cooperation with a seat position locating member 40.

The second embodiment is to provide a female engagement portion 52 extending vertically from the lock arm mounting member 51 of the lock mechanism 50, and a male engagement member 36 engageable with the female engagement member 52 on the opposing base plate 30.

The construction will be described in further detail hereinbelow. The lock arm mounting member 51 is fixed at the middle upper surface of the upper rail 20 by welding, for instance. This member 51 is formed with a reverse U-shaped upward-bent female engagement portion 52 on one vertical surface side thereof and a shaft support portion 51a on the other horizontal surface side thereof extending toward the inner side of the seat. A lock arm mounting shaft 53 is supported by this shaft support portion 51a so that the axial movement of the shaft 53 is restricted.

The base plate 30 is formed with a mounting portion 30a bent toward the upper rail 20 at the lower edge thereof. The middle portion of the mounting portion 30a is bent upward to form a mounting surface 30b, a male engagement member 36 is fixed on the lower surface of the mounting surface 30b by welding, for instance, so as to be opposed to the lock arm mounting member 51. Further, the male engagement member 36 is formed at one end thereof with an L-shaped section engage tongue portion 36a engageable with the female engagement portion 52 of the lock arm mounting member 51.

A lock arm 54 having an L-shaped section engage portion 54a at one end thereof is fixed to the lock arm mounting shaft 53. Therefore, when the lock arm mounting shaft 53 is actuated by operating a release mechanism (not shown), the engagement portion 54a is movable relative to the lower rail 10 and selectively engaged with one of plural locating grooves 40a formed in the seat position locating member 40 disposed under the lower rail 10, so that the seat can be locked at any desired position.

The mounting portion 30a of the base plate 30 is formed with front and rear insertion holes 30c and 30d. Further, the upper rail 20 is formed with front and rear insertion holes 20c and 20d so as to match the holes 30c and 30d in position. Therefore, the base plate 30 is fixed to the upper rail 20 at both the front and rear positions by screwing bolts into these holes or by inserting ribets into these holes before upsetting.

A seat cushion $S_C$ is fixed to the base plate 30, and further a back arm $A_B$ to which a seat back $S_B$ is fixed is pivotally attached to each base plate 30. Further, the base plates 30 are so constructed as to lock the back arms $A_B$ at an appropriate position by a lock mechanism (not shown).

The function of the present invention will be described hereinbelow. To mount the base plate 30 on the upper rail 20, first the female engagement portion 52 of the lock arm mounting member 51 is engaged with the male engagement tongue portion 36a of the male engagement member 36 to temporarily mount the base plate 30 on the upper rail 20. Under these conditions, the base plate 30 is moved in the vehicle front and rear direction to match the insertion holes 30c and 30d of the base plate 30 with the insertion holes 20c and 20d of the upper rail 20. Rivets 32 are inserted into the insertion holes from the base plate side, and upset on the lower surface of the upper rail 20 in order that the base plate 30 is fixed to the upper rail 20 at both the front and rear positions.

As described above, in the vehicle seat according to the present invention, it is possible to fix the base plate 30 to the upper rail 20 on the basis of a predetermined strength determined by the fastening force of the rivets 32 and the engagement force between the male engagement tongue portion 36a and the female engagement portion 52.

Therefore, it is possible to eliminate complicated base plate mounting work such that bolts are screwed or rivets are upset at the middle portion of the base plate 30, as is conventional. That is, it is possible to facilitate the mounting structure of the base plate 30, to improve the mounting strength of the base plate 30, and to prevent the base plate 30 from being deformed inward from the upper rail when a large load is applied to the seat.

Figure 3A:
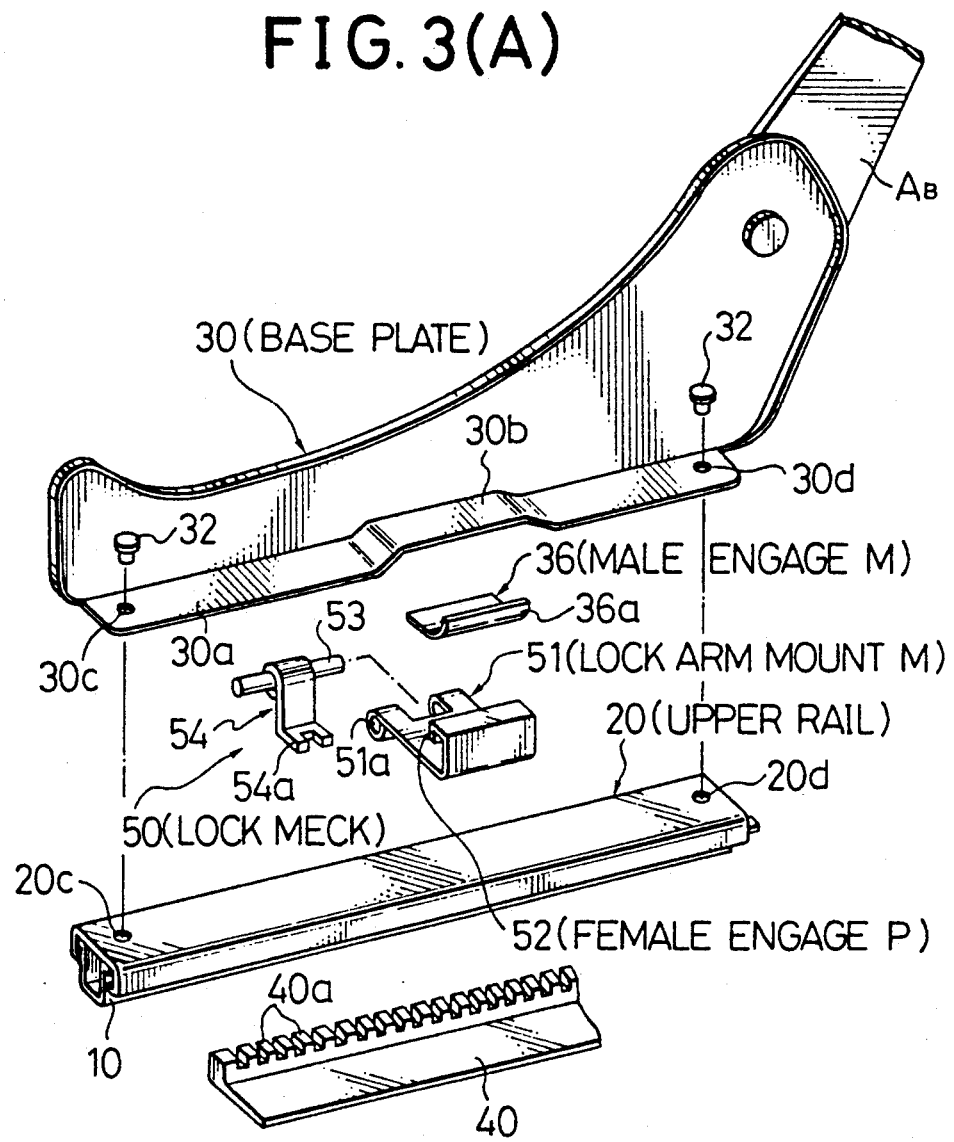
FIG. 3(A) is a partial exploded view showing a second embodiment of the vehicle seat according to the present invention, in which only the one lower side thereof is shown.
Figure 3B:
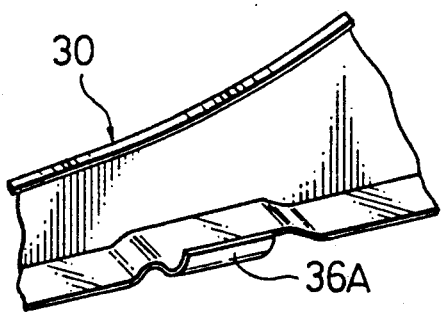
FIG. 3(B) is a further partial perspective view showing a modification of a male engagement member formed integral with the base plate of the vehicle seat.
Figure 4A:
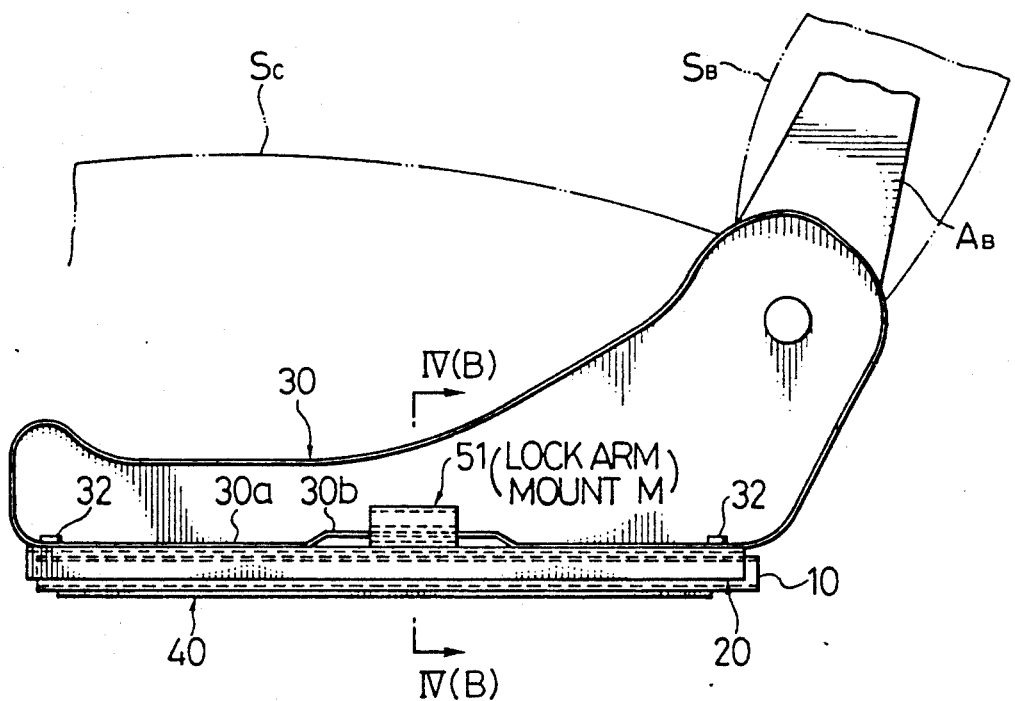
FIG. 4(A) is partial diagrammatical side view showing the same second embodiment shown in FIG. 3(A)
Figure 4B:
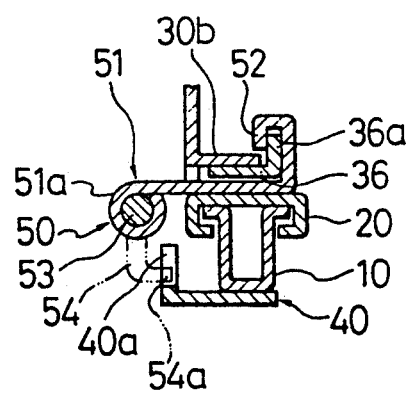
FIG. 4(B) is a partial cross-sectional view taken along the line IV(B)—IV(B) shown in FIG. 4(A).

Further, in the above embodiment, the male engagement member 36 is formed separately from the base plate 30 and fixed to the base plate 30. However, it is also possible to formed the male engagement member 36A integral with the base plate 30, as shown in FIG. 3(B).

As described above, in the vehicle seat according to the present invention, since the middle portion of the base plate is fixed to the upper rail by engaging the female engagement portion of the lock arm mounting member with the male engagement member, the base plate mounting structure can be facilitated; the base plate mounting strength can be improved; the cost of the seat can be reduced; and further the inward deformation of the base plate from the upper rail under large load can be prevented.

What is claimed is:

1. A vehicle seat, comprising:
   (a) a pair of lower rails arranged on a vehicle body floor at an interval along a vehicle transversal direction;
   (b) a pair of upper rails slidably disposed on said lower rails, respectively;
   (c) a pair of base plates fixed to said upper rails, respectively on both ends thereof;
   (d) engagement means for removably engaging said base plates and said upper rails at roughly middle portions thereof, respectively to prevent inward deformation of each of said base plates from each of said upper rails when a large load is applied to said base plates, a lock mechanism having a lock arm mounting member fixed to said upper rail at roughly middle thereof to lock the seat at any desired position in cooperation with a seat position locating member, said engagement means comprising:
   (e) a female engagement portion formed integral with the lock arm mounting member of the lock mechanism; and
   (f) a male engagement member fixed to said base plate at the middle thereof and engageable with said female engagement portion of the lock arm mounting member.

2. The vehicle seat of claim 1, wherein said female engagement portion is a reverse U-shaped upward-bent portion formed integral with the lock arm mounting member; and said male engage member is formed with an L-shaped section engage tongue portion engageable with said reverse U-shaped upward-bent portion, the lock arm mounting member and said male engagement member being both disposed under a middle upward bent mounting surface of said base plate.

3. The vehicle seat of claim 1, wherein said male engagement member is formed integral with said base plate, the lock arm mounting member being disposed under a middle upward bent mounting surface of said base plate.

* * * * *